US012398219B2

(12) United States Patent
Schröder et al.

(10) Patent No.: US 12,398,219 B2
(45) Date of Patent: Aug. 26, 2025

(54) CATALYST AND PREPARATION THEREOF

(71) Applicant: BOREALIS AG, Vienna (AT)

(72) Inventors: Frank Schröder, Linz (AT); Timo Leinonen, Tolkkinen (FI); Peter Denifl, Linz (AT); Sascha Kaltenbacher, Linz (AT); Bernhard Hagemann, Linz (AT)

(73) Assignee: BOREALIS AG, Vienna (AT)

( * ) Notice: Subject to any disclaimer, the term of this patent is extended or adjusted under 35 U.S.C. 154(b) by 372 days.

(21) Appl. No.: 17/908,110

(22) PCT Filed: Mar. 2, 2021

(86) PCT No.: PCT/EP2021/055155
§ 371 (c)(1),
(2) Date: Aug. 30, 2022

(87) PCT Pub. No.: WO2021/175836
PCT Pub. Date: Sep. 10, 2021

(65) Prior Publication Data
US 2023/0113200 A1     Apr. 13, 2023

(30) Foreign Application Priority Data
Mar. 2, 2020    (EP) ..................... 20160459

(51) Int. Cl.
C08F 4/646       (2006.01)
C08F 4/654       (2006.01)
C08F 4/657       (2006.01)
C08F 116/20      (2006.01)

(52) U.S. Cl.
CPC .............. C08F 4/646 (2013.01); C08F 4/654 (2013.01); C08F 4/657 (2013.01); C08F 116/20 (2013.01)

(58) Field of Classification Search
None
See application file for complete search history.

(56) References Cited

U.S. PATENT DOCUMENTS

2005/0176900 A1    8/2005    Zhu et al.

FOREIGN PATENT DOCUMENTS

| CN | 110312740 A | 10/2019 |
|----|-------------|---------|
| EP | 0297076 A2 | 12/1988 |
| EP | 0376936 A2 | 7/1990 |
| EP | 0428054 B1 | 1/1994 |
| EP | 0591224 B1 | 2/1998 |
| EP | 0926165 B1 | 2/2002 |
| EP | 1042331 B1 | 3/2003 |
| EP | 0810235 B1 | 11/2004 |
| EP | 2610270 A1 | 7/2013 |
| JP | 2010-001420 A | 1/2010 |
| JP | 2015-504475 A | 2/2015 |
| JP | 6009722 A | 10/2016 |
| WO | 199105608 A1 | 5/1991 |
| WO | 199212182 A1 | 7/1992 |
| WO | 199618662 A1 | 6/1996 |
| WO | 199858975 A1 | 12/1998 |
| WO | 200155230 A1 | 8/2001 |
| WO | 2003000754 A1 | 1/2003 |
| WO | 2003000757 A1 | 1/2003 |
| WO | 2004007561 A2 | 1/2004 |
| WO | 2004029112 A1 | 4/2004 |
| WO | 2005118655 A1 | 12/2005 |
| WO | 2006063771 A1 | 6/2006 |
| WO | 2007137849 A1 | 12/2007 |
| WO | 2007137853 A1 | 12/2007 |
| WO | 2012007430 A1 | 1/2012 |
| WO | 2013098137 A1 | 7/2013 |
| WO | 2013098138 A1 | 7/2013 |

OTHER PUBLICATIONS

Applicant: Borealis AG; "Catalyst and Preparation Thereof"; Chinese Application No. 202180017838.x; First Chinese Office Action dated Mar. 9, 2023; 15 pgs.
Japanese Application No. 2022-552337, Office Action dated Mar. 8, 2024.
Applicant: Borealis AG; "Catalyst and Preparation Thereof"; European Application No. EP20160459; Extended European Search Report dated Sep. 2, 2020; 8 pgs.
Applicant: Borealis AG; "Catalyst and Preparation Thereof"; International Application No. PCT/EP2021/055155; International Search Report and Written Opinion dated Jun. 4, 2021; 13 pgs.

(Continued)

Primary Examiner — Catherine S Branch
(74) Attorney, Agent, or Firm — Tarolli, Sundheim, Covell & Tummino LLP

(57) ABSTRACT

The present invention relates to a process for producing a solid Ziegler-Natta catalyst component in the form of solid particles having a median particle size ($D50_{vol}$) of 5 to 500 μm and the process comprising steps I. providing a solution of a Group 2 metal dihalide (IUPAC, Nomenclature of Inorganic Chemistry, 2005) by dissolving a solid Group 2 metal dihalide in an alcohol mixture comprising at least a monohydric alcohol (A1) of formula ROM, where R is selected from a hydrocarbyl group of 3 to 16 C atoms and an alcohol (A2) comprising in addition to the hydroxyl group another oxygen containing functional group not being a hydroxyl group, contacting the solution of the Group 2 metal dihalide of step I with a compound in a liquid form of a transition metal of Group 4 to 10, or of a lanthanide or actinide, preferably a transition metal of Group 4 to 6 of Periodic Table (IUPAC, Nomenclature of Inorganic Chemistry, 2005), and III. recovering the solid catalyst component, wherein the amount of Group 2 metal originating from Group 2 metal dihalide constitutes 100% of the whole amount of the Group 2 metal used in the process for producing the solid Ziegler-Natta catalyst component.

16 Claims, No Drawings

(56) References Cited

OTHER PUBLICATIONS

United Arab Emirates Application No. P6001714/2022, Office Action dated Apr. 25, 2024.
Indian Application No. 202217055759, Hearing notice dated Apr. 9, 2025.

CATALYST AND PREPARATION THEREOF

This invention relates to a solid Ziegler-Natta catalyst component for producing olefin polymers and preparation thereof. Further, the invention relates to a Ziegler Natta catalyst comprising said solid catalyst component, Group 13 metal compound as cocatalyst and optionally an external electron donor. The invention further relates to the use of said catalyst component in producing $C_2$ to $C_{10}$ olefin polymers and (co)polymers thereof with other olefins of 2 to 12 C-atoms, especially ethylene and propylene polymers and copolymers thereof.

BACKGROUND OF THE INVENTION

Ziegler-Natta (ZN) type polyolefin catalysts are well known in the field of producing olefin polymers, like $C_2$ to $C_{10}$ olefin polymers and (co)polymers thereof with other α-olefins of 2 to 12 C-atoms. Generally, the catalysts comprise at least a catalyst component formed from a compound of a transition metal of Group 4 to 10, or of lanthanide or actinide of the Periodic Table (IUPAC, Nomenclature of Inorganic Chemistry, 2005), a compound of a metal of Group 1 to 3 of the Periodic Table (IUPAC), optionally, a compound of a metal Group 13 of the Periodic Table (IUPAC), and optionally, an internal organic compound, like an internal electron donor. A ZN catalyst may also comprise further catalyst component(s), such as a cocatalyst and optionally an external electron donor.

A great variety of Ziegler-Natta catalysts have been developed to fulfill the different demands in reaction characteristics and for producing poly(alpha-olefin) resins of desired physical and mechanical performance. Typical Ziegler-Natta catalysts contain a magnesium compound, a titanium compound and optionally an aluminium compound supported on a particulate support. The commonly used particulate supports are Mg dihalide, preferably $MgCl_2$ based supports, or inorganic oxide type supports, such as silica, alumina, titania, silica-alumina or silica-titania, typically silica.

Typical supported Ziegler-Natta catalysts based on $MgCl_2$ contain a titanium compound and optionally a Group 13 compound, for example, an aluminium compound. Such catalysts are disclosed, for instance, in EP376936, EP591224, WO 2005/118655 and EP 810235 disclosing also spray-drying or spray-crystallisation methods for producing $MgCl_2$-based support materials.

EP1042331 and EP0926165 disclose catalyst preparation methods, where $MgCl_2$ is used as a compound forming complexes with in situ prepared donors, being phthalic donors. Catalysts are prepared by precipitation.

The catalyst component can be prepared by sequentially contacting the inorganic support with the above mentioned compounds, for example, as described in EP 688794 and WO 99/51646. Alternatively, it may be prepared by first preparing a solution from the components and then contacting the solution with a support, as described in WO 01/55230.

Still another way to produce solid ZN catalyst component is based on a method, where catalyst component ingredients are reacted in solution and the solid catalyst component is obtained by a solidification or precipitation method. Such preparation method is described e.g. in patent publications WO2003/000757, WO2003/000754, WO2004/029112, WO2007/137849 and WO2007/137853, and further in patent publications WO2012/007430, WO2013/098149, WO2013/098137 and WO2013098138, which disclose catalysts prepared without any phthalic compounds, typically used as internal electron donors. In said patents Group 2 metal compounds (Mg compounds) used as starting compounds in catalyst synthesis are magnesium alkyl and/or magnesium alkoxy compounds.

$MgCl_2$ may be used as a raw material in preparation of supported Ziegler-Natta catalysts. An adduct of $MgCl_2$ and a monohydric short chain ($C_1$ to $C_6$) alkyl alcohol, typically ethanol, may be formed, which is then reacted with titanium tetrachloride and with a donor, like a phthalate. In some preparation processes $MgCl_2$ may also be dissolved in an alcohol, like 2-ethylhexanol, resulting in formation of magnesium dichloride alcoholates, which are complexes of $MgCl_2$ and an alcohol, and which are used in further catalyst preparation steps. Solubility of $MgCl_2$ in the alcohol is reasonable low, whereby typically a high excess of alcohol is needed in order to get $MgCl_2$ dissolved.

WO2004007561 discloses a method for increasing the solubility of a magnesium halide ($MgCl_2$) providing an electron donor compound to form a magnesium-halide composition, where the molar ratio of the electron donor compound to magnesium halide is less than or equal to 1.9.

WO1991005608 discloses a process for forming hydrocarbon-soluble alkoxy-containing magnesium halide complexes in non-Grignard reaction by combining magnesium halide, a second Mg source, like Mg alkoxide, Mg dialkyl or Mg metal, in the presence of a slight excess of the parent alcohol for the desired alkoxy group (OR), and of a short chain alkyl alcohol (e.g. an alcohol containing an alkyl group of about one to four carbon atoms) to effect solubilization of the resulted complex.

US20050176900 describes the preparation of a catalyst starting from $MgCl_2$ in alcohols in the presence of an ether resulting in a catalyst support and further in a catalyst system.

The above described ZN-catalysts are claimed to be useful in olefin polymerisation, for example for producing polymers of α-olefins of 2 to 10 C-atoms, especially of ethylene, propylene, 1-butene or (co)polymers thereof with ethylene and/or other α-olefins of 3 to 12 C-atoms.

Even though many suitable methods are developed to produce catalysts with desired properties and performance, there is a need to find improved methods to prepare the desired catalysts in more efficient and more environmentally friendly way, an still obtain the catalyst with desired properties and performance.

In olefin catalyst manufacturing processes, undesired chemicals, e.g. volatile chemicals, like volatile hydrocarbons, are typically used in the process. In addition, in some reaction steps volatile hydrocarbons are formed as side products of the process, which is from environmental point of view a potential risk. In some processes a high excess of chemicals, like alcohols, are needed in the process. Thus, additional process steps to remove and handle the excess of alcohols is needed. Undesired side reactions may also be seen in use of excess of alcohols and other compounds, e.g. internal electron donors Further, it is desired to find a solution to decrease the amount of used chemicals, which are pyrophoric in nature. They may form already in low concentrations high viscosity solutions making the use thereof demanding in catalyst synthesis. Nowadays, undesired chemicals, like phthalates, are not to be used as any compound in catalyst manufacturing processes. An additional problem in Ziegler-Natta catalyst preparation process relates to recovery and handling of waste streams comprising non-desired compounds.

Exothermic reactions, e.g. reactions between magnesium alkyls and alcohols are demanding to control, need proper cooling systems and may result in non-desired reactions in catalyst synthesis, and further in the use of catalysts in the further steps.

The above problems are problematic not only in safety point of view, but such non-desired, non-controllable reactions may easily effect also the properties of the final polymer.

Solving the above problems should not be made on the cost of catalyst performance nor on the cost of catalyst production. In other words the outtake from the catalyst production should still be on a good level, preferably to be improved. Thus, finding alternative raw materials for catalyst production, which would decrease the problems as indicated above and would still keep, preferably increase catalyst production capacity, is highly desired. Decrease in the costs of catalyst raw materials and preparation is naturally a benefit in improved and modified methods.

SUMMARY OF THE INVENTION

Thus, the object of the present invention is to provide a process for producing a solid Ziegler-Natta catalyst component in the form of solid particles having a median particle size ($D50_{vol}$) of 5 to 500 μm and the process comprising steps I. providing a solution of a Group 2 metal dihalide (IUPAC, Nomenclature of Inorganic Chemistry, 2005) by dissolving a solid Group 2 metal dihalide in an alcohol mixture comprising at least a monohydric alcohol (A1) of formula ROH, where R is selected from a hydrocarbyl group of 3 to 16 C atoms and an alcohol (A2) comprising in addition to the hydroxyl group another oxygen containing functional group not being a hydroxyl group, II. contacting the solution of the Group 2 metal dihalide of step I with a compound in a liquid form of a transition metal of Group 4 to 10, or of a lanthanide or actinide, preferably a transition metal of Group 4 to 6 of Periodic Table (IUPAC, Nomenclature of Inorganic Chemistry, 2005), and III. recovering the solid catalyst component, wherein the amount of Group 2 metal originating from Group 2 metal dihalide constitutes 100% of the whole amount of the Group 2 metal used in the process for producing the solid Ziegler-Natta catalyst component.

Thus, Group 2 metal dihalide is the only source for the Group 2 metal used in the preparation process as defined above.

According to an embodiment, the catalyst component prepared by the process of the present invention, may also comprise an internal electron donor. The optional internal donor may be added at any step before the recovery of the solid catalyst component, i.e. before step III. No phthalic compounds are to be used in the preparation according to the present invention. The optional internal electron donors are suitable among others, non-phthalic esters of carboxylic (di) acids, (di) ethers or oxygen or nitrogen containing silicon compounds, or mixtures thereof. In the present application terms internal donor, internal electron donor and donor have the same meaning. Internal electron donors are preferably used in the inventive catalyst preparation.

Viewed from still another aspect the invention provides a Ziegler-Natta catalyst component in the form of solid particles having a median particle size ($D50_{vol}$) of 5 to 500 μm obtainable, preferably obtained, by the process as herein described.

Viewed from still another aspect, the present invention provides a process for producing $C_2$ to $C_{10}$ α-olefin polymers and copolymers thereof with $C_2$ to $C_{12}$ α-olefin comonomers in the presence of a Ziegler-Natta catalyst component as herein described.

Further, the object of the present invention is the use of the Ziegler-Natta catalyst component as herein described for producing of $C_2$ to $C_{10}$ α-olefin polymers and copolymers thereof with $C_2$ to $C_{12}$ α-olefin comonomers.

In addition, the invention relates to a catalyst comprising the Ziegler-Natta catalyst component as herein described, a cocatalyst and optionally an external electron donor, and use of said catalyst in $C_2$ to $C_{10}$ α-olefin, optionally with $C_2$ to $C_{12}$ α-olefin comonomers, polymerisation process.

The external electron donor denotes a component being not part of the solid catalyst component, but fed as a separate component to the polymerisation process.

DETAILED DESCRIPTION OF THE INVENTION

As indicated above, Group 2 metal dihalide is used as the only raw material of Group 2 metal, preferably Mg, in the process for producing the solid catalyst component as herein defined. The Group 2 metal dihalide is provided as a solution in an alcohol mixture comprising at least a monohydric alcohol (A1) of formula ROH, where R is selected from hydrocarbyl of 3 to 16 C atoms and an alcohol (A2) comprising in addition to the hydroxyl group another oxygen containing functional group not being a hydroxyl group. The Group 2 metal is preferably magnesium. The halide is preferably chlorine. Thus, Group 2 metal dihalide used in the present invention is preferably $MgCl_2$.

Using a Group 2 metal dihalide, preferably $MgCl_2$, as a Group 2 metal source, preferably Mg source, in the preparation of the solid catalyst component of the invention provides several benefits. $MgCl_2$, as a basic chemical, is easily available from commercial sources. $MgCl_2$ is not a hazardous material and is easy to handle also in a larger scale production. However, it has to be taken into account that it is hygroscopic material, i.e. to be handled and stored under conditions, where any contacts with water are avoided.

Commercially available anhydrous $MgCl_2$ typically contains a small amount of water. Water content of commercial anhydrous $MgCl_2$ may typically be up to 2 wt-%. The water content in the $MgCl_2$ to be used in the preparation process of the invention should not exceed 2 wt-%. Thus, the water content in $MgCl_2$ to be used in the process of the invention is ≥0 to 2 wt-%. Said $MgCl_2$ may thus have a water content of 0.1 to 2 wt-%, e.g. 0.3 to 2 wt-%, like 0.5 to 2.0 wt-%.

If the water content in $MgCl_2$ is higher than 2 wt-%, the excess of water needs to be removed before using said $MgCl_2$ in the catalyst preparation process of the invention. Pre-drying or azeptropic distillations with a suitable hydrocarbon may be used to decrease the amount of water into an acceptable level. Drying $MgCl_2$ to 100% dryness is possible to get fully anhydrous $MgCl_2$, but with conventional methods is not easy, and not needed for the purpose of the present invention.

As indicated above, $MgCl_2$ is hygroscopic material, i.e. it is to be handled and stored under conditions, where contacts with water (moisture) are avoided to keep the water content of the $MgCl_2$ on the level below 2 wt-%, as defined above.

The alcohol mixture comprises at least a monohydric alcohol (A1) of formula ROH, where R is selected from hydrocarbyl groups of 2 to 16 C atoms and an alcohol (A2) comprising in addition to the hydroxyl group another oxygen containing functional group not being a hydroxyl group. Preferably, the alcohol mixture consists of alcohols (A1) and (A2) as herein defined.

The monohydric alcohol (A1) as defined above is preferably an alcohol of formula ROH, where R is a hydrocarbyl group of 3 to 12 C atoms, more preferably 5 to 12 C atoms. Still more preferably A1 is selected from linear or branched hexanol, heptanol and octanol. An especially preferred monohydric alcohol is 2-ethyl-hexanol. As indicated above, the alcohol (A2) comprises a functional group not being a hydroxyl group, preferably an ether group. The ether moiety comprises from 2 to 18 carbon atoms, preferably from 2 to 10 carbon atoms, more preferably 2 to 6 carbon atoms. Most preferably, alcohol (A2) is a $C_2$ to $C_4$ glycol monoether.

The weight-% ratio (wt-%/wt-%) of alcohols (A1)/(A2) in the alcohol mixture is in the range of 5/95 to 95/5, preferably in the range of 20/80 to 95/5, more preferably in the range of 40/60 to 90/10, and still more preferably in the range of 60/40 to 90/10. In some embodiments the ratio may be in the range of 70/30 to 90/10, preferably in the range of 70/30 to 85/15 wt-%/wt-%.

The ratio of the used alcohols depend on the type of alcohols, especially on the type of alcohol (A2).

According to the present invention the concentration of the Group 2 metal, preferably Mg, in the alcohol as mol ratio of alcohol/Mg is not specifically restricted as re the higher limit. The alcohol in this connection comprises all alcohols used in dissolving the $MgCl_2$. Thus, it covers here the alcohol mixture as defined above. As indicated above, use of excess of alcohol is not desired, however, the molar ratio is to be high enough to reach the desired solubility. The minimum mol ratio of alcohol/Mg is at least 1 preferably at least 1.5, typically at least 2.0.

The solubility of $MgCl_2$ can be increased by adding solubility increasing agents. Such agents suitably used in the present process are aliphatic or aromatic hydrocarbon solvents. In addition other co-solvents, which do not disturb or deteriorate catalyst manufacturing or catalyst performance, may be used. Such co-solvents may be suitably internal electron donors used in the catalyst preparation.

If such hydrocarbon solvents and/or other co-solvents are used the ratio of alcohol/Mg can be smaller than without using any other solvents and/or co-solvents. Minimum alcohol/Mg mol ratio below 3 or even below 2.5 can then be well reached.

The solvents to be employed in the preparation of the present catalyst may be selected among aromatic and aliphatic linear, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Toluene, heptane and pentane are particular preferred. These solvents may be used e.g. as $MgCl_2$ solubility increasing agents, as a solvent with $TiCl_4$, if so desired, and/or as washing liquids of the obtained solid particles.

The transition metal compound of Group 4 to 10, or of a lanthanide or actinide is preferably a compound of Group 4 to 6, more preferably a Group 4 transition metal compound or a vanadium compound and is still more preferably a titanium compound. More preferably the titanium compound is a halogen-containing titanium compound of the formula $X_y Ti(OR^8)_{4-y}$, wherein each $R^8$ is independently a $C_{1-20}$ alkyl, preferably a $C_{2-10}$ and more preferably a $C_{2-8}$ alkyl group, X is halogen, preferably chlorine, and y is 1, 2, 3 or 4, preferably 2, 3 or 4 and more preferably 4.

Suitable titanium compounds include trialkoxy titanium monochloride, dialkoxy titanium dichloride, alkoxy titanium trichloride and titanium tetrachloride. Most preferably, titanium tetrachloride is used in the process of the present invention. $TiCl_4$ can be used either as such or may be used as a mixture with a hydrocarbon solvent.

The internal donor preferably used in the process of the present invention is suitably selected from esters of non-phthalic carboxylic (di) acids, 1,3-diethers, derivatives and mixtures thereof. More preferably the internal electron donors are esters of non-phthalic (di) carboxylic acids, in particular esters belonging to a group comprising non-substituted or substituted malonates, non-substituted or substituted maleates, like citraconates, succinates, glutarates, cyclohexene-1,2-dicarboxylates and benzoates, and any derivatives and/or mixtures thereof. Especially preferred examples are e.g., substituted maleates, more preferably citraconates, especially di-2-ethylhexyl citraconate.

Catalyst components of the invention or prepared according to the method of the invention have a median particle size ($D50_{vol}$) of 5 to 500 μm preferably in the range of 5 to 300 μm, more preferably in the range of 5 to 200 μm, still more preferably in the range of 10 to 120 μm. In some embodiments the $D50_{vol}$ is preferably in the range of 15 to 80 μm, or even in the range of 15 to 60 μm.

Particle size distribution (PSD) of the catalyst component is desired to be narrow. PSD is typically defined as a relative distribution based on volumetric amount of particles, i.e. as volumetric SPAN ($SPAN_{vol}$).

$$SPAN_{vol} = (D90_{vol} - D10_{vol}) / D50_{vol}$$

where $D90_{vol}$=particle diameter at 90% cumulative volume,
$D10_{vol}$=particle diameter at 10% cumulative volume,
$D50_{vol}$=particle diameter at 50% cumulative volume (median particle size, vol)

PSD of the catalyst component depends on the catalyst preparation process, and may vary in broad ranges. However, narrow PSD, i.e. small SPAN is typically a desired feature of the solid catalyst component. Thus, according to a preferred embodiment of the present invention the PSD of the solid catalyst component, defined by $SPAN_{vol}$ is at most 1.5, more preferably at most 1.3, even more preferably at most 1.1. Catalysts prepared by the specific inventive method may have $SPAN_{vol}$ even below 1.0.

According to a preferred embodiment the invention provides a process for producing solid Ziegler-Natta catalyst component in the form of solid particles having a median particle size ($D50_{vol}$) of 5 to 200 μm and comprises steps:

I. providing a solution of a magnesium dichloride by dissolving a solid magnesium dichloride in an alcohol mixture comprising at least a monohydric alcohol (A1) of formula ROH, where R is selected from a hydrocarbyl group of 2 to 16 C atoms and an alcohol (A2) comprising in addition to the hydroxyl group an ether group, wherein the ether moiety comprises from 2 to 18 carbon atoms, II. contacting the solution of the magnesium dichloride of step I with a compound of a transition metal of Group 4 to 6 of Periodic Table (IUPAC, Nomenclature of Inorganic Chemistry, 2005), preferably $TiCl_4$' and III. recovering the solid catalyst component, wherein the amount of magnesium originating from magnesium dichloride constitutes 100% of the whole amount of the magnesium used in the process for producing the solid Ziegler-Natta catalyst component,
wherein the weight-% ratio (wt-%/wt-%) of alcohols (A1)/(A2) in the alcohol mixture is in the range of 5/95 to 95/5, preferably in the range of 20/80 to 95/5, and
wherein an internal electron donor selected from esters of non-phthalic carboxylic (di) acids, 1,3-diethers, derivatives and mixtures thereof is added before the recovery step III.

In step I, additional solvents, like aliphatic or aromatic hydrocarbon solvent(s) or other co-solvents, e.g. electron donors, as defined above, may be added to facilitate the solubility of the Mg dichloride.

More preferably the internal electron donors are selected from esters of non-phthalic (di) carboxylic acids, in particular esters belonging to a group comprising non-substituted or substituted malonates, non-substituted or substituted maleates, like citraconates, succinates, glutarates, cyclohexene-1,2-dicarboxylates and benzoates, and any derivatives and/or mixtures thereof. Especially preferred examples are e.g, substituted maleates, more preferably citraconates, especially di-2-ethylhexyl citraconate.

Most preferably, alcohol (A2) is a $C_2$ to $C_4$ glycol monoether, especially butoxy propanol.

Use of the mixture of the alcohols as defined above facilitates the dissolving of the metal halide into the alcohol. It has been found that solubility of the Group 2 metal dihalide, preferably $MgCl_2$, in alcohol (A2), preferably selected from glycol ethers, is higher than in monohydric alcohols (A1). In addition, by using an alcohol (A2), e.g. glycol monoether, as a solvent for the Group 2 metal dihalide, preferably $MgCl_2$, the viscosity of the resulting solution is lower than using only a monohydric alcohol (A1) as a solvent. Thus, the amount of other optional solvents, like hydrocarbon solvents, can be decreased in preparing the $MgCl_2$ solution compared to the situation, where only monohydric alcohol is used. Further, the increased solubility of the Group 2 metal halide, preferably $MgCl_2$, in the glycol monoether makes it possible to increase the amount of Mg dissolved into the alcohol mixture. Selecting the ratios of alcohols (A1) and (A2) used in the alcohol mixture enables to control the amount of dissolved Mg in the solution and thus, gives a broader window to the amount of Group 2 metal halide, like $MgCl_2$, to be used as a Group 2 metal source, like Mg source, in the catalyst preparation. Thus, using Group 2 metal halide, like $MgCl_2$ to replace the Mg originating from other Mg compounds, like Mg alkoxides or Mg alkyls, obtained from different sources will be an attractive option.

According to a more preferred embodiment the weight-% ratio of alcohols (A1)/(A2) in the alcohol mixture is in the range of 20/80 to 95/5, more preferably in the range of 40/60 to 90/10, and still more preferably in the range of 60/40 to 90/10, especially in the range of 70/30 to 90/10.

As indicated above, use excess of alcohol is desired to be avoided. I.e. the smaller the molar ratio of the alcohol/Mg is, the less after-treatments of removing and handling the excess alcohol is needed. However, in order to get the desired solubility result, a minimum molar ratio alcohol/Mg is 1, preferably 1.5. The molar ratio of the alcohol/Mg is preferably in the range of 1.5 to 10, more preferably in the range of 1.5 to 6, still more preferably in the range of 1.5 to 4. Thus, the molar ratio of the alcohol/Mg is preferably at most 6, more preferably at most 4, or even at most 3. The molar ratio of the alcohol/Mg is at least 1, preferably at least 1.5, e.g. at least 1.7, or at least 2 combined with any of the upper ratios and preferred upper ratios.

According to the procedure of the invention, the solid catalyst may be obtained via precipitation method or via emulsion—solidification method depending on the physical conditions, especially on the temperature used in the contacting step II. Emulsion is also called a liquid/liquid two-phase system.

In both methods (precipitation or emulsion-solidification) the catalyst chemistry is the same.

In the precipitation method combining the solution of the Group 2 metal dihalide in the mixture of alcohols as herein defined with the at least one transition metal compound is carried out and the whole reaction mixture is kept at least at 50° C., more preferably at the temperature in the range of 55 to 110° C., more preferably in the range of 70 to 100° C., to secure full precipitation of the catalyst component in form of a solid particles.

In the emulsion—solidification method the solution of the Group 2 metal dihalide in the mixture of alcohols as herein defined is added to the at least one transition metal compound at a lower temperature, such as from −10 to below 50° C., preferably at a temperature in the range of −5 to 30° C., wherein an emulsion is formed. During agitation of the emulsion the temperature is typically kept at −10 to below 40° C., preferably from −5 to 30° C. Droplets of the dispersed phase of the emulsion form the catalyst composition. Solidification of the droplets is suitably carried out by heating the emulsion to a temperature of 70 to 150° C., preferably to 80 to 110° C.

In the emulsion-solidification method, the dispersed phase in the form of liquid droplets of the emulsion forms the catalyst part, which is transformed to solid catalyst particles during the solidification step.

The catalyst prepared by emulsion—solidification method is preferably used in the present invention.

In the emulsion-solidification method, the formation of the liquid/liquid two-phase system (emulsion) may be facilitated by adding (further) solvent(s) and additives, such as surfactants. Surfactants act as emulsifying agents, which are used in a manner known in the art for facilitating the formation of and/or stabilizing the emulsion. Preferably, surfactants used in the present invention are acrylic or methacrylic polymers. Particular preferred surfactants are unbranched $C_{12}$ to $C_{20}$ (meth)acrylates such as poly(hexadecyl)-methacrylate and poly(octadecyl)-methacrylate and mixtures thereof. Surfactants may added at any step before the recovery step III. Surfactants may also be used in preparing a catalyst component by the above precipitation method.

Before the final recovery the solid particulate catalyst product produced according to the process of the invention may be washed at least once, preferably at least three times, most preferably at least five times with aromatic and/or aliphatic hydrocarbons, preferably with toluene, heptane or pentane and/or with $TiCl_4$. Said washing solutions may also contain internal donor(s) and/or compound(s) of Group 13, like trialkyl aluminum, halogenated alkyl aluminum compounds or alkoxy aluminum compounds. The aluminum compounds may also be added during the catalyst synthesis. The catalyst can further be dried, e.g. by evaporation or flushing with nitrogen before the final recovery. If desired, catalyst component may be slurried to an oily liquid with or without any drying step.

The finally obtained Ziegler-Natta catalyst component of the invention is desirably in the form of spherical particles having volumetric median particle size ($D50_{vol}$) of 5 to 200 μm, and $SPAN_{vol}$ is at most 1.3, more preferably at most 1.2, even more preferably at most 1.1.

The catalyst particles prepared by the method as described above have preferably a surface area of less than 20 m²/g, more preferably of less than 10 m²/g.

Catalyst preparation with emulsion-solidification method make it possible to obtain solid catalyst with low SPAN$_{vol}$ and low surface area. Thus, SPAN$_{vol}$ 1.2 or below, preferably below 1.1 and still more preferably below 1.0 and a surface area of less than 10 m²/g, preferably even less than 5 m²/g can be reached.

Typically, the amount of Ti is in the range of 1-6 wt-%, preferably in the range of 1.5 to 5 wt-%, the amount of Mg is in the range of 10 to 20 wt-%, preferably in the range of 12 to 18 wt-% and the amount of the internal donor is in the range of 5 to 35 wt-%, preferably in the range of 10 to 25 wt-%, in the catalyst component.

The catalyst of the invention comprises, in addition to the solid catalyst component as defined above, a cocatalyst, which is also known as an activator and optionally an external electron donor.

Cocatalysts are preferably organometallic compounds of Group 13 metal, typically aluminium compounds. These compounds include aluminium alkyls and alkyl aluminium halides. Preferably, the alkyl group is a $C_1$-$C_8$ alkyl group, preferably $C_1$-$C_4$ alkyl group, and the halide is a chloride. Preferably the co-catalyst (Co) is a tri ($C_1$-$C_4$) alkylaluminium, di($C_1$-$C_4$) alkyl aluminium chloride or ($C_1$-$C_4$) alkyl aluminium dichloride or mixtures thereof. Most preferably, the alkyl group is ethyl. In one specific embodiment, the co-catalyst (Co) is triethylaluminium (TEAL).

External electron donors are typically used in propylene polymerization, however also known to have been used in ethylene polymerisation. In the present application the terms external electron donor and external donor have the same meaning.

Suitable external electron donors (ED) include certain silanes, ethers, esters, amines, ketones, heterocyclic compounds and blends thereof. It is especially preferred to use silanes selected from silanes of the general formula (A)

$$R^a{}_pR^b{}_qSi(OR^c)_{(4-p-q)} \tag{A}$$

wherein $R^a$, $R^b$ and $R^c$ are independently same or different a linear, branched or cyclic hydrocarbon group having 1 to 12 carbon atom, in particular an alkyl or cycloalkyl group, and wherein p and q are numbers ranging from 0 to 3 with their sum p+q being equal to or less than 3; or silanes of general formula (B)

$$Si(OCH_2CH_3)_3(NR^3R^4) \tag{B}$$

wherein $R^3$ and $R^4$ can be the same or different and represent a linear, branched or cyclic hydrocarbon group having 1 to 12 carbon atoms. Preferably, $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl, and are more preferably ethyl.

Most preferably external donors are selected form silanes of formula (A) and especially selected from (tert-butyl)$_2$Si(OCH$_3$)$_2$, (cyclohexyl)(methyl)Si(OCH$_3$)$_2$, (cyclopentyl)$_2$Si(OCH$_3$)$_2$ and (phenyl)$_2$Si(OCH$_3$)$_2$.

The catalyst of the present invention is used for polymerising $C_2$ to $C_{10}$ olefin, preferably $C_2$ to $C_6$ olefin, optionally with one or more comonomers. Most commonly produced olefin polymers are polyethylene, polypropylene and copolymers thereof. The catalyst of the present invention is especially suitable for producing polypropylene and copolymers thereof. Commonly used comonomers are ethylene and alpha-olefin comonomers preferably selected from $C_4$-$C_{20}$-alpha-olefins, more preferably are selected from ethylene and $C_4$-$C_{12}$-alpha-olefins, such as 1-butene, isobutene, 1-pentene, 1-hexene, 4-methyl-1-pentene, 1-heptene, 1-octene, 1-nonene and 1-decene, as well as dienes, such as butadiene, 1,7-octadiene and 1,4-hexadiene, or cyclic olefins, such as norbornene, and any mixtures thereof. Most preferably, the comonomer is ethylene, 1-butene and/or 1-hexene.

According to a preferred embodiment the catalyst component of the present invention is in the form of solid spherical particles and is free of any external support material, like silica or any separately prepared MgCl$_2$ based support. The solid catalyst component is prepared by the process as described above.

According to the preferred preparation method the solution of MgCl$_2$ in the mixture of alcohols as described above, at least one compound of a transition metal of Group 4 to 6, most preferably a TiCl$_4$,, and an internal electron donor or precursor thereof are contacted and reacted in solution, and after that the solid catalyst particles are formed either by precipitation or preferably by forming an emulsion and further solidifying the droplets of the emulsion. The final catalyst contains said internal electron donor as defined above, and Ti and Mg in amounts as indicated above. The preferred methods result in the catalyst component in the form of solid particles having features as indicated above. In addition the solid catalyst particles are featured by a uniform distribution of catalytically active sites thorough the catalyst particles.

Polymerisation

Catalyst of the present invention can be used in any commonly used uni- and multimodal processes for producing polyolefins. The polymerizations may be operated in slurry, solution, or gas phase reactors or combinations thereof. Typically ethylene and propylene (co)polymers are produced in commercial scale in a multimodal process configuration. Such multimodal polymerization processes known in the art comprise at least two polymerization stages. It is preferred to operate the polymerization stages in cascaded mode. Suitable processes comprising cascaded slurry and gas phase polymerization stages are disclosed, among others, in WO92/12182 and WO96/18662 and WO WO98/58975.

In a multimodal polymerisation configuration, the polymerisation stages comprise polymerisation reactors selected from slurry and gas phase reactors. In one preferred embodiment, the multimodal polymerisation configuration comprises at least one slurry reactor, followed by at least one gas phase reactor.

The catalyst may be transferred into the polymerization process by any means known in the art. It is thus possible to suspend the catalyst in a diluent and maintain it as homogeneous slurry. Especially preferred is to use oil having a viscosity from 20 to 1500 mPa·s as diluent, as disclosed in WO-A-2006/063771.It is also possible to mix the catalyst with a viscous mixture of grease and oil and feed the resultant paste into the polymerization zone. Further still, it is possible to let the catalyst settle and introduce portions of thus obtained catalyst mud into the polymerization zone in a manner disclosed, for instance, in EP-A-428054.

The polymerization in slurry may take place in an inert diluent, typically a hydrocarbon diluent such as methane, ethane, propane, n-butane, isobutane, pentanes, hexanes, heptanes, octanes etc., or their mixtures. Preferably, the diluent is a low-boiling hydrocarbon having from 1 to 4 carbon atoms, like propane or a mixture of such hydrocarbons. In propylene polymerisation the propylene monomer is usually used as the reaction medium.

The temperature in the slurry polymerization is typically from 40 to 115° C., preferably from 60 to 110° C. and in particular from 70 to 100° C., like from 70 to 90° C. The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor. Hydrogen is fed, optionally, into the reactor to control the molecular weight of the polymer as known in the art. Furthermore, one or more alpha-olefin comonomers may be added into the reactor. The actual amount of such hydrogen and comonomer feeds depends on the desired melt index (or molecular weight), density or comonomer content of the resulting polymer.

The polymerization in gas phase may be conducted in a fluidized bed reactor, in a fast fluidized bed reactor or in a settled bed reactor or in any combination of these.

Typically the fluidized bed or settled bed polymerization reactor is operated at a temperature within the range of from 50 to 100° C., preferably from 65 to 90° C. The pressure is suitably from 10 to 40 bar, preferably from 15 to 30 bar.

Also antistatic agent(s) may be introduced into the slurry and/or gas phase reactor if needed. The process may further comprise pre- and post-reactors.

The actual polymerization steps may be preceded by a pre-polymerisation step. The pre-polymerisation step may be conducted in slurry or in gas phase. Preferably pre-polymerisation is conducted in slurry, and especially in a loop reactor. The temperature in the pre-polymerisation step is typically from 0° C. to 90° C., preferably from 20° C. to 80° C. and more preferably from 30° C. to 70° C.

The pressure is not critical and is typically from 1 to 150 bar, preferably from 10 to 100 bar.

The polymerisation may be carried out continuously or batch wise, preferably the polymerisation is carried out continuously in commercial scale polymerisation.

Experimental Part

Measurement Methods

Chemical Composition

Approximately 100 mg of dry catalyst or a catalyst slurry sample with a similar amount of catalyst is hydrolysed in an ultrasonic bath, with 5 mL of 5 w % $H_2SO_4$ containing 200 mg/L Y as internal standard for ICP OES, after also adding ~15 mg hexadecane as internal standard for GC and 5 mL of pentane. After full hydrolysis, followed by centrifugation, the pentane phase is removed. The aqueous phase is extracted two time more with 5 mL pentane. All pentane solutions are combined and 1 mL is transferred via a 0.45 µm filter into a GC-vial for the following GC analysis of the donor. The remaining, organic free, aqueous phase is diluted to 100 mL using a 5 w % $H_2SO_4$ solution, for the subsequent ICP OES determination of Mg and Ti.

ICP OES Analysis

Mg is analysed at 279.079 nm, Ti at 336.121 nm and the internal standard Y at 371.030 nm on any ICP OES, using a glass concentric micromist nebuliser and a glass cyclonic spray chamber. Every sequence is linearly and unweightedly calibrated using a blank, a low and a high standard.

GC-FID Analysis

1 µL of the pentane solution is injected into the split/splitless inlet of any GC-FID at 275° C. with a tapered liner containing glass wool, with a split ratio of 100:1. The GC-separation is done on any column suitable to separate the donor from the used white oil, e.g. a DB-5 30 m, 0.32 mm ID, 0.1 µm film thickness. Quantification is done with an FID, which is linearly and unweightedly calibrated with a low and a high standard, using hexadecane as internal standard.

Particle Size Distribution—Automated Image Analysis

The sample consisting of dry catalyst powder or catalyst slurry in white oil is diluted with white oil to an approximate concentration of 1 w % and homogenised. This slurry is injected into a wet cell, which after settling is analysed by an automated microscope (Malvern 3G) at magnification 5. Artefacts, impurities and touching particles are excluded in the evaluation software using a sphericity filter.

The particle diameter is calculated as the circular equivalent (CE) diameter. The size range for particles included in the distribution is 5-200 µm. The distribution is calculated with at least 60000 particles as a numerical moment-ratio density function distribution and statistical descriptors calculated based on the numerical distribution. The numerical distribution can for each bin size be recalculated for an estimate of the volume transformed distribution.

The following particle size and particle size distribution indicators have been used in the experiments:

$D90_{vol}$=particle diameter at 90% cumulative volume,
$D10_{vol}$=particle diameter at 10% cumulative volume,
$D50_{vol}$=particle diameter at 50% cumulative volume (median particle size, vol)

$$SPAN_{vol}=(D90_{vol}-D10_{vol})/D50_{vol}$$

Melt Flow Rate $MFR_2$:230° C., 2.16 kg load

The melt flow rate is measured in accordance with ISO 1133 and is indicated as g/10 min.

EXAMPLES

Raw Materials $TiCl_4$ (CAS 7550-45-90) was supplied by commercial source.
20% solution in toluene of butyl ethyl magnesium (Mg (Bu)(Et)), provided by Crompton
2-ethylhexanol, provided by Merck Chemicals
3-Butoxy-2-propanol, provided by Sigma-Aldrich
bis(2-ethylhexyl) citraconate, provided by Contract Chemicals
Viscoplex® 1-254, provided by Evonik
Heptane, provided by Chevron
Anhydrous $MgCl_2$, moisture content at most 1.0%, provided by Magnesia GmbH, Germany, Comparative Example 1 CE1 a) Preparation of Soluble Mg-Alkoxide 3.4 litre of 2-ethylhexanol (Alcohol A1) and 810 ml of propylene glycol butyl monoether (Alcohol A2) (in a molar ratio A1/A2 of 4/1) were added to a 20 l steel reactor. Then 7.8 litre of a 20% solution in toluene of BEM (butyl ethyl magnesium), were slowly added to the well stirred alcohol mixture. During the addition the temperature was kept at 10° C. After addition the temperature of the reaction mixture was raised to 60° C. and mixing was continued at this temperature for 30 minutes. Finally, after cooling to room temperature the obtained Mg-alkoxide was transferred to a storage vessel. Mg content of 2.75 wt-% was found by ICP. Alcohol to BEM molar ratio was 2.2.

b) Preparation of Mg Complex 21.2 g of Mg alkoxide prepared in step a) was mixed with 4.0 ml of electron donor (bis(2-ethylhexyl) citraconate) for 5 min. After mixing, the obtained Mg complex was used immediately in the preparation of the catalyst component.

c) Preparation of the Catalyst Component

Preparation of catalyst component was performed in a jacketed thermostated 100 ml glass reactor equipped with a pitched blade impeller. The reactor was charged with 13.0 ml of $TiCl_4$ and tempered at 15° C. Mixing speed was adjusted to 500 rpm. 16.8 g of Mg-complex prepared in step b) was added to $TiCl_4$ within 20 minutes keeping the temperature at 15° C. 0.7 ml of Viscoplex® 1-254 and 21.0 ml of heptane were then added, whereby an emulsion was formed. Mixing (700 rpm) was continued for 30 minutes at 15° C., after which the reactor temperature was raised to 90° C. within 45 minutes. The reaction mixture was stirred for a further 30 minutes at 90° C. at 700 rpm. Afterwards stirring was stopped and the reaction mixture was allowed to settle for 15 minutes at 90° C. The solid material was washed 5 times: Washings were made at 80° C. under stirring for 20 min with 500 rpm with toluene, $TiCl_4$/donor mixture, toluene and twice with heptane. After stirring was stopped the reaction mixture was allowed to settle for 10-30 minutes and followed by siphoning between the washes.

After the last wash the temperature was decreased to 70° C. with subsequent siphoning, followed by $N_2$ purge for 60 minutes to yield an air sensitive powder.

Inventive Example 1-IE1

The catalyst may be prepared according to the following inventive preparation procedure: 1.86 g of anhydrous $MgCl_2$ (Mg content 0.47 g), used as provided by Magnesia GmbH, is placed in a 300 ml glass reactor equipped with a stirrer. Temperature is kept at 25° C. by keeping the reactor in a cooling bath when adding 6, 18 g of an alcohol mixture containing 4,96 g (80 wt-%) of 2-ethylhexanol (A1) and 1,24 g (20 wt-%) of butoxypropanol (A2). After addition of the alcohol mixture, the reactor temperature is increased to 130-140° C. and stirred to dissolve the $MgCl_2$. The temperature is cooled down to 100° C. 1.8 g of toluene and 7.0 g of heptane are added into the mixture. The obtained solution is cooled to room temperature, and 2.7 g of donor (bis(2-ethylhexyl) citraconate) is added. As a result a clear solution (Solution 1) is obtained Preparation of Catalyst Component 19.0 g of the Solution 1 is added to 20.00 g of $TiCl_4$. 1.15 g of Viscoplex in heptane (50 wt-%) is added followed by addition of 11.5 g of heptane. The formed emulsion is heated from room temperature (21° C.) to 90° C. (0.8° C./min).

The reaction mixture is stirred for a further 30 minutes at 90° C. at 700 rpm and then the reaction mixture is allowed to settle for 15 minutes at 90° C. The solid material is washed 5 times: Washings are made at 80° C. under stirring for 20 min with 500 rpm with toluene (30 ml), $TiCl_4$ (15 ml), toluene (30 ml) and thereafter twice with heptane. After the stirring is stopped the reaction mixture is allowed to settle for 10-30 minutes followed by siphoning between the washes.

After the last wash the temperature is decreased to 70° C. with subsequent siphoning, followed by $N_2$ purge for 60 minutes to yield an air sensitive powder.

Inventive Example 2-IE2

A glass lined pressure reactor equipped with a mechanical stirrer was charged with heptane (7.7 kg) anhydrous $MgCl_2$ (2.55 kg), as provided, 2-ethylhexanol A1 (5.9 kg) and butoxypropanol A2 (1.5 kg). The mixture was then heated to 140-145° C. and stirred for 12 hours. The contents were cooled down to room temperature to obtain a clear solution (Solution2).

14.2 g of Solution 2 was mixed with 2-ethylhexyl citraconate (3.0 g) and fed to 14 mL of $TiCl_4$ under stirring at 15° C. over 20 minutes. Viscoplex 1-254 (0.7 mL) was then added followed by addition of heptane (11 ml). The mixture was stirred for an additional 30 minutes at 15° C. The temperature of the mixture was then gradually raised to 90° C. over the course of 45 minutes. The stirring was continued for 30 minutes at 90° C. The solid was then allowed to settle and the liquid was siphoned off and disrecarded. Solid material was then washed in succession with toluene (40 mL), titanium tetrachloride (15 ml) and toluene (30 ml) while maintaining the temperature at 80° C. The resulting solid was washed twice with heptane at 60° C. and the dried in N2 flow to afford solid spherical catalyst.

Analytical results of the catalysts are disclosed in Table 1.

TABLE 1

Analytical results of the catalyst of IE1, IE2 and CE1

|  | IE1 | IE2 | CE1 |
|---|---|---|---|
| Ti-content/wt-% | 3.2 | 2.9 | 2.64 |
| Mg-content/wt-% | 16.3 | 13.6 | 13.2 |
| Bis(2-ehthylhexyl) citraconate/wt-% | 18.7 | 18.6 | 17.3 |
| $SPAN_{vol}$ | 0.89 | — | 0.56 |
| D50/μm | 20.0 | — | 61.0 |

In the catalyst preparation method according to the inventive method, excess of alcohols could be avoided. Amount of magnesium can be increased and reactions went smoothly Polymerisation A 5 litre stainless steel reactor was used for propylene polymerisations.

About 0.9 ml triethyl aluminium (TEA) (from Witco, used as received) as a co-catalyst, ca 0.13 ml dicyclopentyl dimethoxy silane (DCDS) (from Wacker, dried with molecular sieves) as an external donor and 30 ml n-pentane were mixed and allowed to react for 5 minutes. Half of the mixture was then added to the polymerisation reactor and the other half was mixed with about 20 mg of a catalyst. After additional 5 minutes the catalyst/TEA/donor/n-pentane mixture was added to the reactor. The Al/Ti ratio was 250 mol/mol and the Al/DCDS ratio was 10 mol/mol. 200 mmol hydrogen and 1400 g propylene were introduced into the reactor and the temperature was raised within ca 20 minutes to the polymerisation temperature (80° C.). The polymerisation time after reaching polymerisation temperature was 60 minutes, after which the polymer formed was taken out from the reactor. Polymerisation results are disclosed in Table 2.

Polymerisation results show that catalyst activity is higher than in the comparative example and melt flow rate is on the same level or even lower, which shows that catalyst of the invention fulfils the polymerisation criteria with improved activity and high Mw capability.

TABLE 2

| | Polymerisation results | |
|---|---|---|
| Catalyst | Activity kg PP/g cat h | MFR2 g/10 min |
| CE1 | 35.4 | 15.3 |
| IE1 | 41.9 | 8.5 |
| IE2 | 36.0 | 15.9 |

The invention claimed is:

1. A process for producing a solid Ziegler-Natta catalyst component in the form of solid particles having a median particle size ($D50_{vol}$) of 5 to 500 μm and the process comprising the following steps:
   I. providing a solution of magnesium dichloride by dissolving solid magnesium dichloride in an alcohol mixture comprising at least a monohydric alcohol (A1) of formula ROH, where R is selected from a hydrocarbyl group of 3 to 16 C atoms and an alcohol (A2) comprising in addition to the hydroxyl group another oxygen containing functional group not being a hydroxyl group,
   II. contacting the solution of the magnesium dichloride with a compound in a liquid form of a transition metal of Group 4 to 10 of Periodic Table (IUPAC, Nomenclature of Inorganic Chemistry, 2005), or of a lanthanide or actinide, and
   III. recovering the solid catalyst component,
   wherein the amount of magnesium metal originating from magnesium dichloride constitutes 100% of the whole amount of the magnesium metal used in the process for producing the solid Ziegler-Natta catalyst component.

2. The process according to claim 1, wherein an internal donor is added to the process before the recovery step III, wherein the internal donor is selected from the group consisting of esters of non-phthalic carboxylic acids, ethers, di-ethers and oxygen or nitrogen containing silicon compounds.

3. The process according to claim 1, wherein the transition metal compound is a Group 4 to 6 transition metal compound.

4. The process according to claim 1, wherein in the alcohol (A2) the another oxygen containing functional group not being a hydroxyl group is an ether group, wherein the ether moiety comprises from 2 to 18 carbon atoms.

5. The process according to claim 1, wherein the weight % ratio (wt %/wt %) of alcohols (A1)/(A2) in the alcohol mixture is in the range of 5/95 to 95/5.

6. The process according to claim 1, wherein the molar ratio of the alcohol/Mg is at least 1, wherein the alcohol comprises all alcohols used in the alcohol mixture.

7. The process according to claim 1, wherein solubility increasing agents are added in step I and these solubility increasing agents comprise aliphatic or aromatic hydrocarbon solvents and other co-solvents comprising internal electron donors.

8. A Ziegler-Natta catalyst component in the form of solid particles having a median particle size ($D50_{vol}$) of 5 to 500 μm, obtained by the process as claimed in claim 1.

9. The Ziegler-Natta catalyst component according to claim 8, wherein the amount of Ti is in the range of 1-6 wt %, the amount of Mg is in the range of 10 to 20 wt % and the amount of the internal donor is in the range of 5 to 35 wt % in the catalyst component.

10. The Ziegler-Natta catalyst component according to claim 7, wherein the catalyst component has a surface area of less than 20 m²/g and $SPAN_{vol}$ below 1.1.

11. A Ziegler-Natta catalyst comprising a Ziegler-Natta catalyst component according to claim 9 or prepared according to the method of claim 1, a cocatalyst of group 13 compound and optionally an external electron donor.

12. A process for producing polymers of α-olefins of 2 to 10 C atoms or copolymers thereof with $C_2$ to $C_{12}$ α-olefin comonomers in the presence of the Ziegler-Natta catalyst according to claim 11.

13. The process for producing a solid Ziegler-Natta catalyst component according to claim 3, wherein the transition metal compound is a Group 4 transition metal compound.

14. The process for producing a solid Ziegler-Natta catalyst component according to claim 3, wherein the transition metal compound is titanium tetrachloride.

15. The process for producing a solid Ziegler-Natta catalyst component according to claim 1, wherein the solution of the magnesium dichloride of step I is contacted with a compound in a liquid form of a transition metal of Group 4 or of vanadium.

16. The process for producing a solid Ziegler-Natta catalyst component according to claim 4, wherein the alcohol (A2) is a $C_2$ to $C_4$ glycol monoether.

* * * * *